Figure 1:
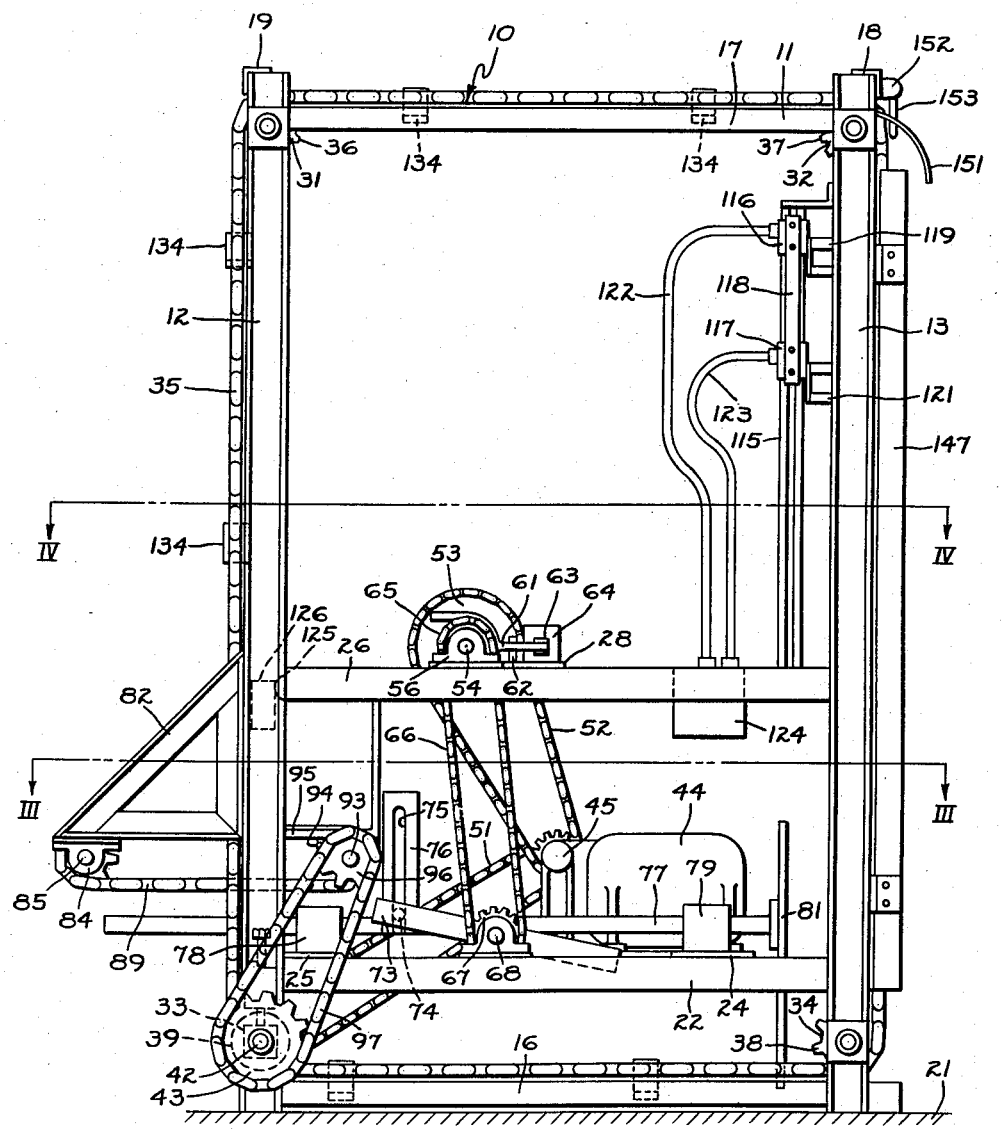

Feb. 9, 1960 R. R. ST. JEAN ET AL 2,924,342
STACKING APPARATUS
Filed Nov. 6, 1956 6 Sheets-Sheet 1

INVENTORS
Robert R. St. Jean
William H. Warman
BY
Attorney

Feb. 9, 1960

R. R. ST. JEAN ET AL 2,924,342

STACKING APPARATUS

Filed Nov. 6, 1956

6 Sheets-Sheet 3

INVENTORS
Robert R. St. Jean
BY William H. Warman

Norman S. Blodgett
Attorney

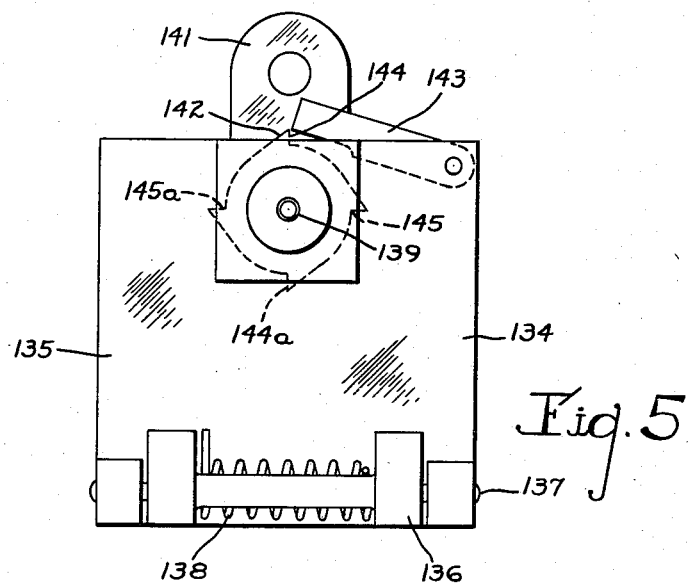
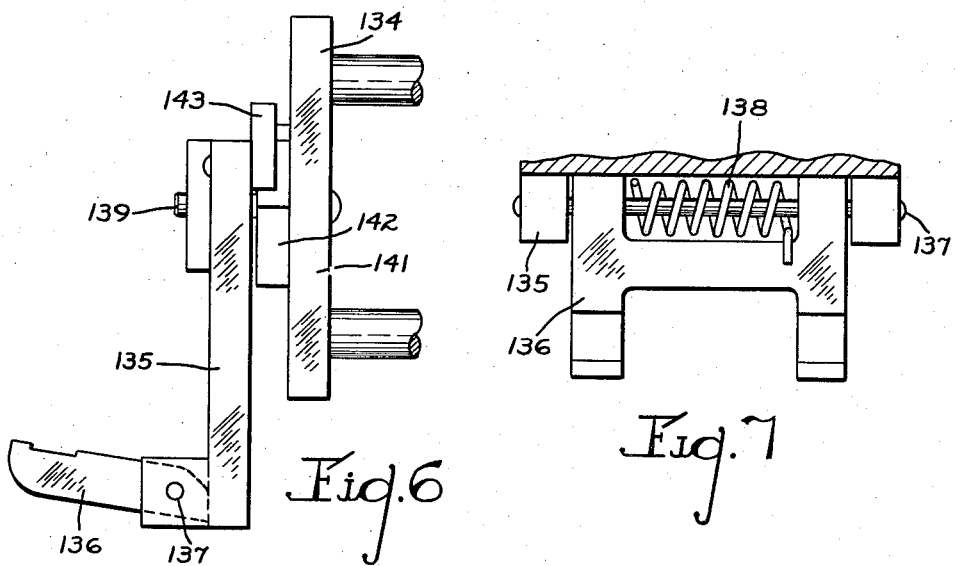

Feb. 9, 1960

R. R. ST. JEAN ET AL 2,924,342

STACKING APPARATUS

Filed Nov. 6, 1956

6 Sheets-Sheet 6

INVENTORS
Robert R. St. Jean
BY William H. Warman
Norman L. Blodgett
Attorney

United States Patent Office 2,924,342
Patented Feb. 9, 1960

2,924,342
STACKING APPARATUS

Robert R. St. Jean and William H. Warman, Auburn, Mass., assignors to Worcester Automatic Machine Company, Worcester, Mass., a corporation of Massachusetts Application November 6, 1956, Serial No. 620,736

10 Claims. (Cl. 214—6)

This invention relates to stacking apparatus and more particularly to a device for placing reavy containers or the like one above the other.

Circumstances are often encountered in materials handling practice where it is necessary to stack moderately heavy articles, such as containers, one above the other to a considerable height. This is particularly true in the distribution of food stuff. For instance, in a milk-bottling plant the cases of filled milk bottles leave the bottling machine on a roller conveyor and enter a refrigerated "holding" room from which they are eventually loaded into trucks for distribution. The holding room is of limited size and the economics of the situation demand that the milk cases be stacked to use the space most efficiently. In the past it has been the custom to stack these cases by hand, but because of the cold atmosphere in the holding room this has always been a disagreeable and tiring job. The men so employed often become ill or, when tired, they would drop cases and break bottles; furthermore, it has been difficult to obtain men to undertake this type of labor in the first place. Attempts have been made to provide machines for doing this work, but they have alwys been complicated and expensive and have required extensive alterations in the building. These and other deficiencies of the prior art have been obviated by the present invention in a novel manner.

It is therefore an outstanding object of the present invention to provide a stacking apparatus that is simple in construction, rugged and dependable, inexpensive to manufacture and which may be installed without alteration of the building in which it is placed.

Another object of the invention is the provision of a stacking apparatus which is capable of placing several cases of filled bottles or the like one above the other without damages to cases, bottles or contents.

A still further object of this invention is the provision of an apparatus for stacking containers which provides for the automatic movement of a stack out of the apparatus when completed.

With these and other objects in view, as will be apparent to those skilled in the art, the invention resides in the combination of parts set forth in the specification and covered by the claims appended hereto.

Figure 2:
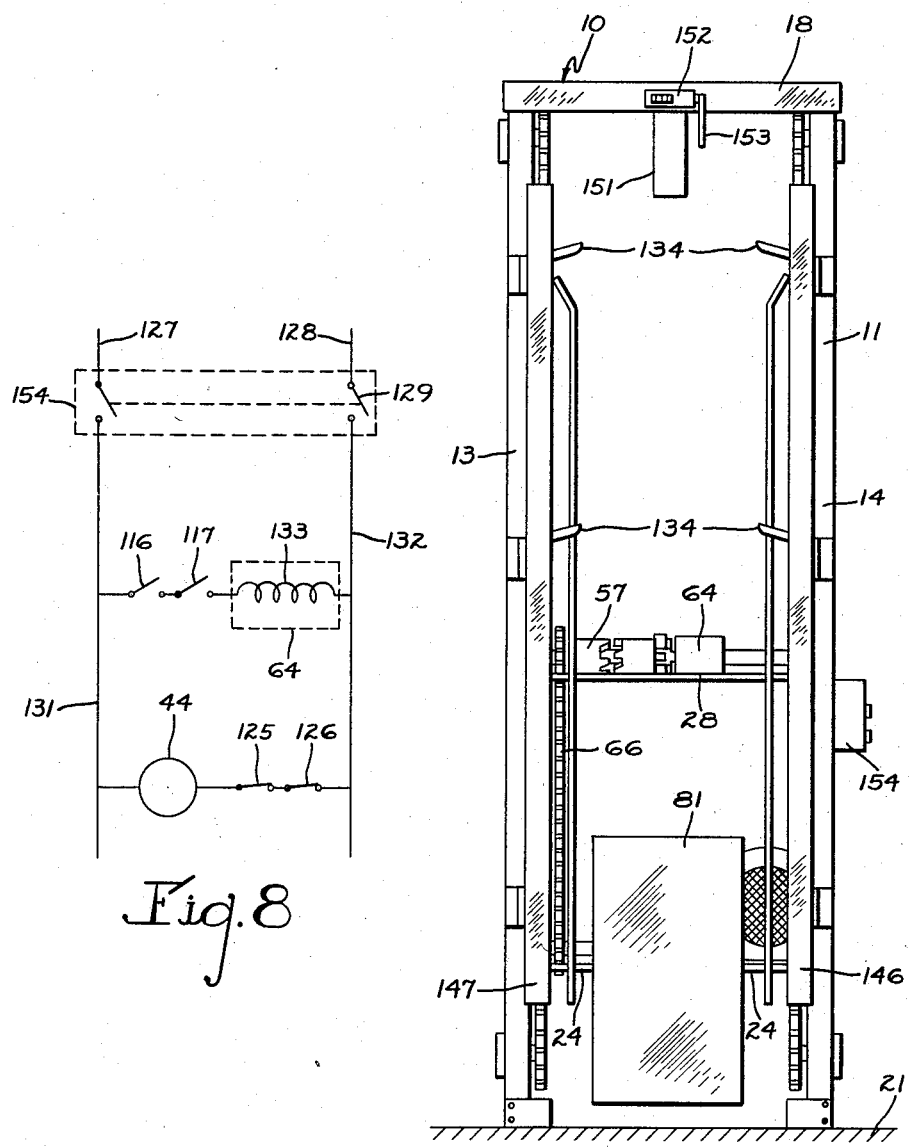
Figure 3:
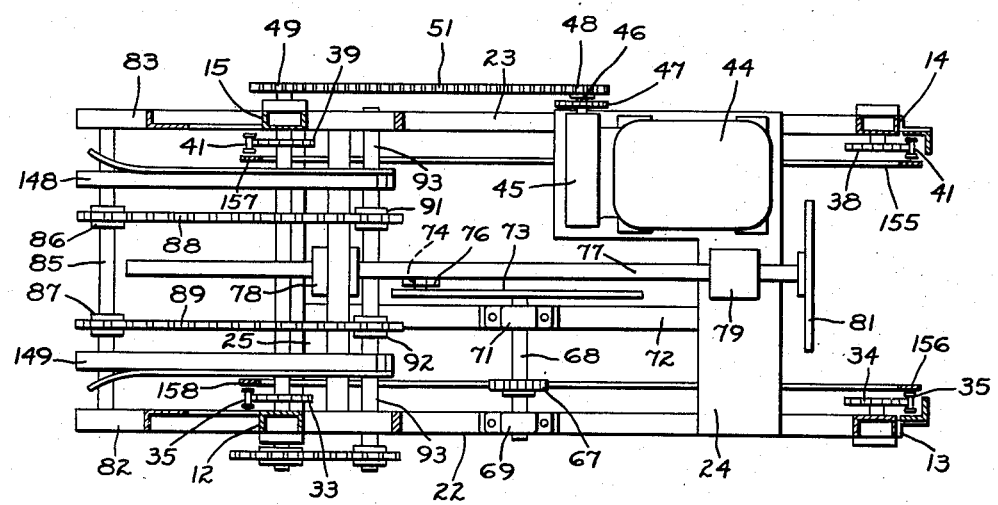
Figure 4:
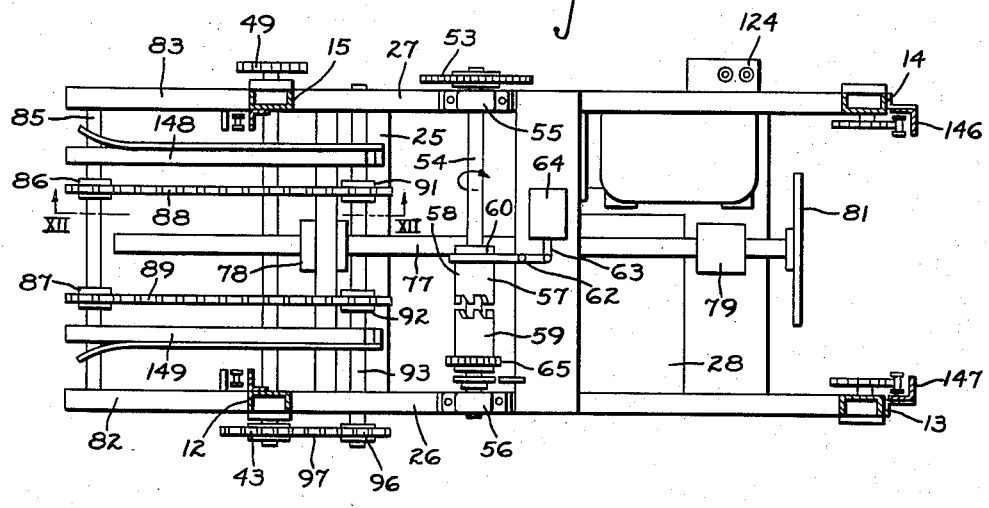
Figure 9:
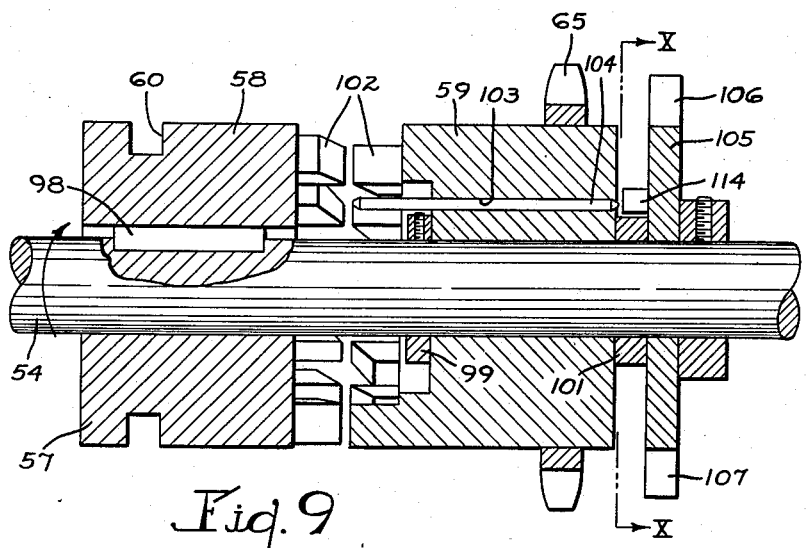
Figure 10:
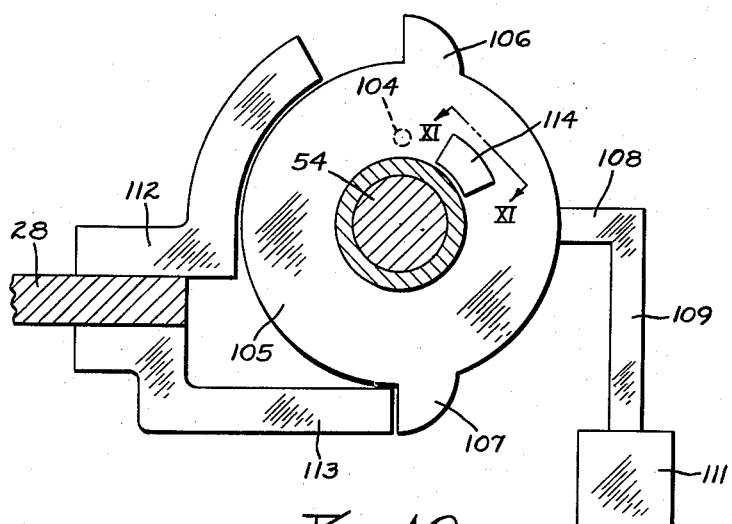
Figure 11:
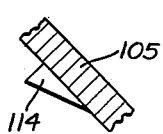
Figure 12:
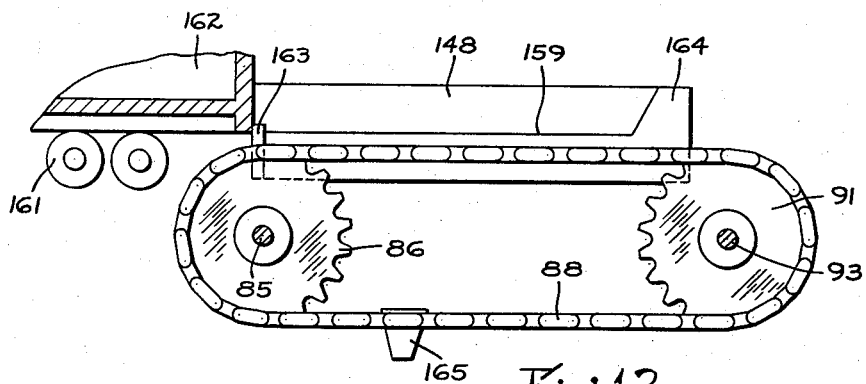
Figure 13:
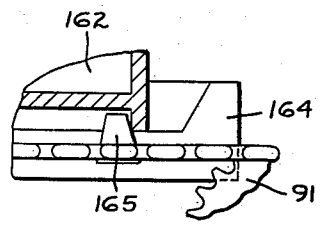

The character of the invention, however, may be best understood by reference to certain of its structural forms, as illustrated by the accompanying drawings in which:

Figure 1 is a side elevational view of a stacking apparatus constructed according to the philosophy of the invention, Figure 2 is an end elevational view of the apparatus, Figure 3 is a horizontal sectional view of the apparatus taken on the line III—III of Figure 1, Figure 4 is a horizontal sectional view of the apparatus taken on the line IV—IV of Figure 1, Figure 5 is a side elevational view of a part of the apparatus, Figure 6 is an end elevational view of the part, Figure 7 is a plan view of a portion of the part, Figure 8 is a schematic view of the electrical wiring in the apparatus, Figure 9 is a sectional view of a clutch forming a part of the apparatus, Figure 10 is a view of the clutch taken on the line X—X of Figure 9, Figure 11 is a view of a portion of the clutch taken on the line XI—XI of Figure 10, Figure 12 is a vertical sectional view of a portion of the machine taken on the line XII—XII of Figure 4, and Figures 13 through 16 are enlarged views of a portion of the apparatus of Figure 12, showing a sequence of operations.

Similar reference characters are used to denote like parts in the several figures of the drawings. Throughout this specification, the expression "longitudinal" will be used to indicate a generally horizontal direction parallel to the plan of Figure 1, while the expression "transverse" will be used to indicate a generally horizontal direction at a right angle thereto or parallel to the plane of Figure 2.

Referring first to Figures 1 and 2, wherein are best shown the overall features of the invention, the stacking apparatus, indicated generally by the reference numeral 10 is shown as comprising a main frame 11 consisting of four vertical beams 12, 13, 14 and 15. The beams 12 and 13 are joined at the bottom by a horizontal longitudinal beam 16 and at the top by a longitudinal beam 17; the beams 14 and 15 are joined at the bottom in a similar manner by a longitudinal beam, not shown, and at the top by another longitudinal beam, not shown. The beams 13 and 14 are joined at their upper ends by a transverse beam 18, while the beams 12 and 15 are connected at their upper ends by a similar transverse beam 19. The beams are, thus, joined to form a rigid, box-like structure, the dimension in the transverse direction being considerably less than the longitudinal dimension; the height is determined by the number of cases which are to be stacked. The assemblage is adapted to rest on a floor 21.

The beams 12 and 13 are connected by a horizontal longitudinal brace 22 which is located a short distance about the beam 16 and the floor 21; a similar brace 23 extends on the same level between the beams 14 and 15. These braces reside at a height approximately the same height as a standard roller conveyor. These braces are joined by a platform 24 adjacent the end formed by the beams 13 and 14, which end will be designated as the "exit" end. At the other end, which will be called the "entrance" end, the braces are joined by another platform 25. Located above the beam 22, but somewhat below the midpoint in vertical height of the structure is another longitudinal brace 26 connecting the beams 12 and 13, while at the same level a longitudinal brace 27 joins the vertical beams 14 and 15. Between the braces 26 and 27 extends a platform 28.

On the inside surface of the beams, both at the top and bottom, are mounted sprocket wheels over which run chain belts. For instance, the inner surfaces of the beams 12 and 13 have sprocket wheels 31, 32, 33 and 34 mounted thereon and an endless, roller-type link belt 35 extends around them; similar sprocket wheels 36, 37, 38 and 39 are rotatably mounted on the inner surfaces of the vertical beams 14 and 15 with a link belt 41 passed over them. The sprocket wheels are for the most part mounted with their shafts carried in plain bearings welded to the respective beams. In the case of the sprocket wheels 33 and 39, however, the bearing blocks are slidably mounted for vertical movement on the respective beams and a threaded adjusting screw 41 provides for vertical adjustment; in this way the tension on the link belts may be changed. A horizontal shaft 42 extends between the sprocket wheels and is keyed to them; the shaft extends through a slot, not shown, in the beam 12 and at the outer side of the beam a large sprocket wheel 43 is keyed to the shaft. The shaft extends through the beam 15 also and is provided with a sprocket wheel 49.

Mounted on the platform 24 is an electric motor 44 with a speed-reduction unit 45 connected thereto and having a transverse output shaft 46 which extends well outside the plane of the beams 14 and 15 and has sprocket wheels 47 and 48 keyed thereto. The sprocket wheel 48 is connected in driving relation by means of a chain belt 51 to the sprocket wheel 49 keyed to the shaft 42.

The sprocket wheel 47 is connected by a chain belt 52 to a large sprocket wheel 53 keyed to an outboard end of a shaft 54 which is mounted transversely of the apparatus in pillow block bearings 55 and 56 fastened to braces 27 and 26 respectively. Mounted centrally of the shaft is a single-revolution clutch 57, the details of which will be described more fully hereinafter. The clutch consists of an input portion 58 and an output portion 59. The input portion 58 is keyed to the shaft 54 to allow movement along the shaft but to prevent relative rotative motion. The portion 58 is provided with a groove 60 in which resides the bifurcation of a yoke 61 which is pivotally mounted in its intermediate portion to the plate 28 by means of pivot pin 62. The other end of the yoke is hingedly connected to the outer end of a plunger 63 of a solenoid 64 fastened to the platform 28. When the solenoid is energized, the plunger is drawn inwardly.

The output portion 59 of the clutch is mounted on the shaft 54 to permit rotation relative thereto, but not to allow axial sliding. Fastened to the output portion and rotatable therewith is a sprocket wheel 65 which is connected by a chain belt 66 to a sprocket wheel 67. The wheel 67 is keyed to a stub shaft 68 which extends partly across the apparatus transversely thereof. It is supported in a pillow block bearing 69 fastened to the brace 22 and a similar bearing 71 fastened to a brace 72 which extends between the platforms 24 and 25. Fastened to the inner end of the shaft is a crank arm 73 having a pin 74 which rests in a straight vertical slot 75 in a cross-slide member 76. The slot 75 is somewhat larger than twice the distance from the axis of the shaft 68 to the center of the pin 74. The member 76 is welded to the center of an elongated bar 77; the member is placed at a right angle to the length of the bar and extends as far below as it does above it. The bar is slightly longer than the overall apparatus and is mounted longitudinally and horizontally for longitudinal sliding motion in bearings 78 and 79 which are supported by the platforms 25 and 24, respectively. To the end of the bar adjacent the discharge end of the apparatus is connected a vertical push-out plate 81 whose lower edge is adjacent the floor 21.

To the entrance beams 12 and 15 are fastened triangular supporting brackets 82 and 83, respectively, having horizontal longitudinal lower edges on a level well above the bar 77. Under the part of the bracket 82 furthest away from the beam 12 is mounted a pillow block bearing 84, while the bracket 83 is similarly provided. A horizontal transverse shaft 85 is mounted in this pair of bearings and sprocket wheels 86 and 87 are mounted on opposite sides of the centerline of the apparatus. These sprocket wheels 86 and 87 are connected by roller-type chain belts 88 and 89, respectively to sprocket wheels 91 and 92 so that each belt has an upper longitudinal horizontal run about on a level with the lower surfaces of the triangular supporting brackets. The sprocket wheels 91 and 92 are keyed to a transverse shaft 93 which is, in turn, carried in pillow block bearings, such as the bearing 94, fastened to brackets, such as the bracket 95 dependent from the beam 12 and the brace 26. On an outwardly-extending end of the shaft 93 is keyed a sprocket wheel 96 which is connected in driving relation by a chain 97 to the sprocket wheel 43 on the shaft 42.

Referring to Figures 9, 10, and 11, the clutch 57 is shown with its portions 58 and 59 mounted on the shaft 54. The input portion 58 engages a key 98, so that it can slide axially along the shaft, but cannot rotate relative thereto. The output portion 59 is permitted to rotate on the shaft but is prevented from sliding axially by means of annular collars 99 and 101 which are fastened in place on the shaft by set screws. The sprocket wheel 65 is mounted on the output portion 59 in the usual manner. The portions are each provided with teeth 102, each of which has a straight side and an inclined side to provide driving in one direction only, i.e., the direction of rotation of the shaft indicated in Figure 9. A bore 103 extends axially through the portion 59 and in it lies a push rod 104 that has rounded ends. Fastened to the shaft 54 at the end of the portion 59 opposite the end carrying the teeth is a cam plate 105 having a dog 106 formed to extend in the normally upward direction and a dog 107 extending downwardly. Between the dogs on the periphery of the cam plate is a protuberance 108 to which is welded a vertical stem 109 at the lower end of which is fastened a weight 111. The outer periphery of the cam plate is very close to the edge of the platform 28 and a stop 112 is fastened to the platform to engage the dog 106 upon rotation of the shaft 54 and the plate. In the same way, a stop 113 is fastened to the platform to engage the dog 107 when it is in the normal position shown in Figure 10. The portion 59 of the plate 105 is oriented so that when the plate is in the normal position, the extension of the rod 104 intersects the plate in the dotted circle shown in Figure 10. A cam 114 is formed on the plate adjacent the portion 59 and the bore 103, and has its greatest throw adjacent the bore, as is evident in Figures 10 and 11.

Extending vertically from the brace 27 and connected to the beam 14 is a rail member 115 on which is slidably mounted normally-open switches 116 and 117. These switches are held in a preselected relationship by a steel rod 118 connected to each. The switch 116 has a contact arm 119, while switch 117 has a similar contact arm 121. Conduits 122 and 123 extend from the switches 116 and 117, respectively, to a control box 124. Normally-closed switches 125 and 126 are fastened to the inner surfaces of the beams 12 and 15, respectively, and have contact arms, not shown. The electrical arrangement is shown in Figure 8. Lines 127 and 128 are connected to a source of electrical power and to a main switch 129. Lines 131 and 132 are connected to the other sides of the switches. The normally-open switch 116, the normally-open switch 117 and the coil 133 of the solenoid 64 are connected in series from line 131 to line 132, so that the coil is not energized unless both switches 116 and 117 are closed and the main switch 129 is also closed, of course. The motor 44, the normally-closed switch 125 and the normally-closed switch 126 are connected in series from the line 131 to the line 132 and, if the main switch is closed, the motor is energized unless one of the switches 125 and 126 is opened.

As is evident in Figure 1, each of the belts 35 and 41 are provided with container-grasping members 134 which are spaced along the belt, each belt having such a member exactly opposite a similar member on the other belt. In Figures 5, 6 and 7, it will be observed that each member 134 comprises a main body 135 of generally thin, rectangular formation having a bifurcated finger 136 hingedly connected by a pin 137 to its lower portion and biased toward a position at a right angle to the body member by a coil spring 138. The finger cannot be moved below this right angle position because of the interengagement of the lower inner portion of the finger with the body, but it is capable of being folded against spring resistance against the face of the body. A pivot pin 139 passes through the upper central part of the body and connects it swingably to a support 141 adapted to be fastened to one of the chain belts 35 and 41. The support has a cam-shaped boss 142 formed on its face which is engageable by a detent finger 143 pivotally connected to the main body. Two shoulders 144, 145, 144a, and 145a are formed on the boss in position to engage the end of the detent finger on occasion.

In addition to other features of the apparatus described above, it should be noted that angle irons 146 and 147 are arranged vertically along the beams 14 and 13, respectively, at the exit end of the apparatus. Furthermore, guide rails 148 and 149 are arranged at the entrance end on a level with and parallel to the upper horizontal runs of the chain belts 88 and 89, respectively. These guide rails are flared at the entrance end. A curved retaining rail 151 extends from the upper part of the exit end of the apparatus to control swaying of the container. At the same position, a counter 152 having a contact arm 153 is fastened to the transverse beam 18. A starter box 154 is mounted on the side of the apparatus to contain the main switch 129. Rails 155 and 156 are provided along the entire length of the bottom of the apparatus to engage the container-grasping members, as will be explained, and vertical rails 157 and 158 extend upwardly from them at the entrance end of the apparatus to slightly above the level of the rails 148 and 149.

The operation of the apparatus will now be readily understood in view of the above description. The operator closes the main switch 129 and the motor 44 rotates. It drives the chain belts 35 and 41 through the medium of the reduction unit 45, the shaft 46, the sprocket wheel 48, the chain belt 51, the sprocket wheel 49, the shaft 42, and the sprocket wheels 33 and 39. The chain belts carry the container-grasping members 134 with them as they pass over the sprocket wheels 31, 32, 34, 36, 37 and 38; since each support 141 is firmly connected to a link of the chain, it maintains the aspect of the chain, but the main body 135 always hangs in a vertical position because of the pivotal movement allowed by the pin 139. Cases containing full bottles of milk arrive one by one at the apparatus on a roller conveyor or the like and with their under surfaces at the level of the upper run of the chain belts 88 and 89. Usually a case arrives at the entrance to the apparatus with a certain amount of momentum and travels onto the belts 88 and 89 under its own power. Eventually, however, the belts must provide the power for further progress. The manner in which the shaft 42 is driven from the motor 44 has already been described. This shaft also drives the belts 88 and 89 through the medium of the sprocket wheel 43, the chain belt 97, the sprocket wheel 76, the shaft 93 and the sprocket wheels 91 and 92. The belts, of course, merely idle over the sprocket wheels 86 and 87 and the upper run of the chain progresses inwardly of the apparatus carrying the case with them. The case is aligned properly by the vertical flanges of the guides 148 and 149 and is partly supported by the horizontal flanges of these guides. Eventually, the case arrives at a point where a line joining the vertical run of the chain belts 35 and 41 at the entrance end would pass through the center of the case. Now, these cases are made with a horizontally-elongated hand hole through each side. The pair of container-grasping members 134 which arrive adjacent the case serve to lift the case from the supporting table formed by the belts 88 and 89 and the guides 148 and 149. The members, as they move upward from below the case, slide along the vertical guides 157 and 158 which maintain the finger 136 in folded position against the main body 135. The top of these guides is close to the bottom of the case, however, so that when the member 134 arrives beside the case, its finger 136 is unrestrained by a guide; then, the spring 138 forces the finger against the side of the case and it slides upwardly along it. Eventually, the member reaches the hand hole of the case and the finger springs into it. Further upward motion of the member brings the upper surface of the finger into contact with the downwardly-facing surface of the hand hole and the member lifts the case. If only one member makes a connection with the case and the other one does not, the bottom of the case will swing toward the first member and, as the case is raised, the corner will strike either the switch 125 or the switch 126, thus opening it and shutting off the motor. The operator may then correct the difficulty at his leisure before starting the machine again. Assuming, however, that the case is properly seated and supported on two matching container-grasping members 134, it begins its travels with the chains 35 and 41. After the vertical run is finished and the members pass over the sprocket wheels 31 and 36, the members move along the upper horizontal run of the chains. Because of the pivotal motion between the main body 135 and the support 141, the case continues to hang downwardly. As the members pass around the sprocket wheels 32 and 37 and start downwardly, there is a tendency for the case, fingers and main body to swing about the pivot pins 139; this is effectively prevented by the retaining rail 151 along which the upper forward edge of the case slides. As the case starts downwardly, it strikes the contact arm 153 of the counter 152, thus recording the passage of the case. On the downward passage, the chain belts 35 and 41 and the member 134 are prevented from swinging to any great extent by the angle irons 146 and 147. If the case is the first or bottom one of a stack, it eventually comes in contact with the floor 21 between the beams 13 and 14. The members continue to move downwardly past the sides of the case and this causes the fingers 136 to fold toward the main body 135 and to slide out of the hand holes. As each member passes around the sprocket wheels 34 and 38 and begin the lower horizontal run, the finger is maintained in position against the main body by one of the rails 155 and 156. As successive cases arrive at the entrance end of the apparatus, they are lifted vertically upwardly, transported horizontally toward the discharge end, and lowered vertically. The second case, for instance, will be placed on top of the first case, whose deposit has been described particularly above. The cases are built, usually, to permit the interengagement of the bottom of one with the top of the other without sideways slippage, for instance, by posts at the four upper corners of the lower case which fit into corner sockets formed in the bottom of the other case. The switches 116 and 117 have been positioned on the rail 118 so that their contact arms 120 and 119 will lie against the next to last and the last case, respectively, of the stack. In the usual situation, a stack will consist of six cases and the switch 117 will be held closed by the fifth case, while the switch 118 will be held closed by the side of the sixth or top case in the stack. When these two switches have been closed, current flows through the coil 133 of the solenoid 64, so that the plunger 63 is thrown inwardly. The yoke 61 is rotated about its pivot pin 62, so that the input portion 58 of the clutch 57 is thrown toward the output portion. Now, the output portion is being continually rotated by the motor 44 through the reduction unit 45, the shaft 46, the sprocket wheel 47, the chain belt 52, the sprocket wheel 53 and the shaft 54. The teeth 102 of the two portions of the clutch engage in driving relation, since the shaft 54 and the portion 58 are rotating in the direction of the arrow in Figure 9. The force of the two portions coming together forces the push rod 104 through the bore 103 until it strikes the cam plate 105 approximately in the position shown in dotted lines in Figure 10. The two portions rotate together and the sprocket wheel 65 rotates also, thus driving the chain belt 66 also and the sprocket wheel 67. The rotation of the sprocket wheel 67 causes the shaft 68 to rotate and carry with it the crank arm 73; the pin 74 on the crank arm extends into the slot 75 of the cross-slide member 76, so that it causes the cross-slide member and the bar 77 to partake of a longitudinal harmonic motion with the bearings 78 and 79. The pushout plate 81 is caused to move in this same manner. The crank arm 73 occupies the horizontal position with the pin 74 at the entrance end, as shown in Figure 1, at the moment the clutch engages. The motion of the pushout plate is slow at first, reaches its highest speed as the crank arm moves through the vertical position, and slows to zero speed as it approaches the horizontal position with the pin 74 adjacent the exit end. During the movement of the pushout plate toward the exit end of the apparatus, it presses against the stack of cases and moves it in the same manner. The stroke of the bar and pushout plate is selected so that a new stack of cases may be formed immediately behind the one just pushed out. The continued rotation of the shaft 68 and the crank arm 73 carries the bar and pushout plate back to the original position by the same harmonic motion. The sizes of the sprocket wheels 65 and 67 are selected so that the clutch 57 goes through one engaged rotation while the shaft 68 and the crank arm 73 pass through a single rotation. Now, referring to Figures 9, 10 and 11, the cam plate 105 is freely mounted on the shaft 54 and is not inclined to rotate with it because of the restraint imposed by the weight 111. However, when the output portion 59 of the clutch has nearly completed a rotation, the push rod 104 strikes the low side of the cam 114 and begins to slide along its inclined surface. The first tendency of this engagement is to drive the rod through the bore 103, but it is prevented from doing this by the fact that the face of the input portion of the clutch prevents it. So, instead, the pin carries the cam plate 105 along with the output portion of the clutch for a short while, and, then, the dog 106 on the cam plate strikes the stop 112 extending from the platform 28. When this happens, the push rod is forced to slide over the inclined surface of the cam and slides in the bore 103. This forces the input portion 58 of the clutch along the shaft 54 and, when the rod 104 reaches the high point of the cam, the clutch teeth are entirely separated and power is no longer transmitted from the input portion to the output portion. At this point the pushout plate has returned to its original position and the way is clear for the deposit of the first case of the next stack. The pin 104 drops over the steep end of the cam 114; the cam plate is, thus, unrestrained and the weight 111 causes the plate to rotate in the opposite direction until the dog 107 strikes the stop 113 fastened to the platform 28. The cam plate remains in this stable position until the next pushout cycle. The entire pushout cycle takes place in a length of time considerably shorter than the least possible length of time between the arrival of successive cases, so that there is no danger of the first case of the next stack striking the upper rear edge of the stack being pushed from the exit end of the apparatus. It will be understood that, because each new stack of cases is formed immediately behind its predecessor, the pushout mechanism will possibly serve to move several stacks by pushing on the rearwardmost stack; the only limitation is the torque available from the motor and the design strength of the various components.

As each of the chains 35 and 41 completes a circuit around its loops, it carries a member 134 with it; however, since the member 134 is pivotally mounted it always hang downwardly; the link of chain and the support 141 rotate through 360° relative to the main body 135. In order to prevent swinging of the main body and the case which it supports, the detent finger 143 engages one of the shoulders 144, 145, 144a, or 145a. This also assures that the main body is not swinging when the member is coming up from beneath a case to engage a hand hold.

Figure 14:
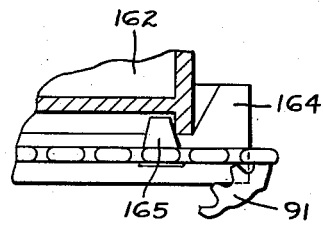
Figure 15:
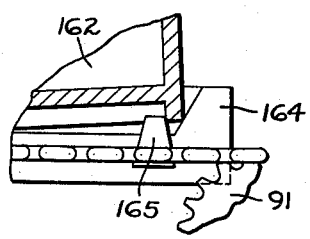
Figure 16:
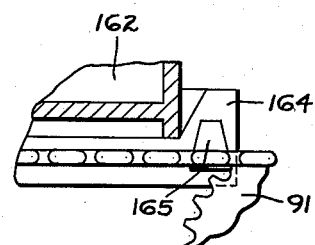

Reference to the manner in which each case is located in the guides 148 and 149 has been purposely omitted heretofore. This part of the operation will be best understood by reference to Figures 12 through 16. In Figure 12 it is evident that the upper run of the chain 88 lies slightly below the surface of the horizontal flange 159 of the guide 148. The upper surface of a roller conveyor 161 leading to the apparatus is on a level with this surface. The forward corner of a milk case 162 is shown resting on the conveyor and also rests against a stop 163 which is bolted to the end of the guide so as to extend a short distance above the level of the surface of the horizontal flange 159. At the other end of the guide is a steeply-inclined block 164. Rigidly fastened to one link of the belt 88 is a dog 165 of trapezoidal form, the forward surface being inclined at only a slight angle to the vertical when it passed along the upper pass. When the machine is operated, the case 162 is moved along the conveyor toward the apparatus until its forward end strikes the stop 163. Eventually, the chain 88 progresses to the point where the dog strikes the flanged bottom of the case. The dog not only lifts the flange over the stop, but it also drags the case into the apparatus. Eventually the case rests entirely on the guides and is moving toward the inclined block 164; this is the situation shown in Figure 13. Eventually, the case strikes the block 164, as shown in Figure 14, and is moved up its inclined surface in the manner shown in Figure 15. The bottom edge of the flange of the case rises upwardly, tipping the case slightly, until the dog 165 is able to slide under the flange and proceed on its way without the case. Then, the edge of the case slides back down the incline and rests entirely on the guides. In this way the case is not introduced into the guides until it is evident that the preceding case has been removed and, in addition, the case is accurately located for engagement by the container-grasping members 134.

It is obvious that minor changes may be made in the from and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A stacking apparatus for containers having hand holes in opposed walls comprising a framework having an entrance end and an exit end, means including a horizontal chain conveyor associated with the entrance end on a level with incoming containers for conveying the containers one by one into the framework, a transport means including a pair of chain belts arranged to form two parallel, closed loops in vertical planes mounted on the framework and having a pair of container-grasping members, the members engaging the hand holes of each container with a chain belt on each side, the transport means lifting it vertically, transporting it longitudinally, then lowering it vertically, and releasing it adjacent the exit end of the framework by the said members disengaging the hand holes, and means including a pushout plate operable when a predetermined number of containers have been deposited in stacked relationship to move the containers in a body with harmonic motion longitudinally out of the framework at the exit end.

2. A stacking aparatus for containers comprising a framework, conveyor means associated with one end of the framework for moving containers one by one into the framework, a transport means mounted on the framework and having a vertical path of movement, the transport means engaging each container and lifting it vertically, the conveyor means including a pair of spaced, parallel, guides each having a horizontal surface on which the container may rest, an endless belt lying between the guides and having a dog adapted to engage and move a container, and an inclined block located a fixed distance from the path of movement of the transport means associated with each guide and adapted to lift the forward end of the container as the dog moves it along the guides, the container then sliding rearwardly down the block into a preselected pickup position relative to the path of movement of the transport means.

3. A stacking apparatus for containers comprising a framework, conveyor means associated with one end of the framework for moving containers one by one into the framework, a transport means mounted on the framework, the vertically-moving transport means having container-grasping members engaging each container and lifting it vertically, the conveyor means including a pair of spaced, parallel, guides each having a horizontal surface on which the container may rest, a pair of spaced, parallel endless belts lying between the guides entirely below the level of the said horizontal surfaces and each having an inclined dog extending above the level of the said horizontal surfaces adapted to engage and move a container, and an inclined block associated with the innermost end of each guide and adapted to lift the forward end of the container as the dog moves it along the guides, the container then sliding rearwardly down the block into a preselected pickup position relative to the path of movement of the transport means.

4. A stacking apparatus for containers having hand holes, comprising a framework having an entrance end and an exit end, conveyor means associated with the entrance end of the framework for conveying containers one by one into the framework and depositing each container accurately in a preselected pick-up position, a vertically-moving transport means mounted on the framework, the transport means engaging the hand holes of each container, lifting it vertically, transporting it longitudinally, lowering it, and releasing it adjacent the exit end of the framework, means preventing swinging of the container during the passage from the entrance end to the exit end, means including a vertical push-out plate operable when a predetermined number of containers have been deposited in stacked relationship to move the containers in a body with harmonic motion longitudinally out of the framework at the exit end, the conveyor means associated with the entrance end of the framework including a pair of spaced parallel guides, each having a horizontal surface on which the container may rest, a dog movable along the line between the guides and adapted to engage and move a container, and an inclined block associated with each guide located a fixed distance from the paths of movement of the transport means and adapted to lift the forward end of the container as the dog moves it along the guides, the container then sliding rearwardly down the block to a preselected pick-up position relative to the path of movement of the transport means.

5. A stacking apparatus for containers having hand holes, comprising a framework having an entrance end and an exit end, conveyor means associated with the entrance end of the framework for conveying containers one by one into the framework and depositing each container accurately in a pre-selected pick-up position, a vertically moving transport means mounted on the framework, the transport means engaging the hand holes of each container, lifting it vertically, transporting it longitudinally, lowering it, and releasing it adjacent the exit end of the framework, means preventing swinging of the container during the passage from the entrance end to the exit end, a container-grasping member attached to the transport means, the container-grasping member consisting of a main body and a finger, the finger being hingedly attached to the body to be capable of assuming a first position close to the body or a second position at a right angle thereto, the body being mounted on the transport means for movement therewith about a pivotal axis at a right angle to and spaced from the axis of hinged attachment of the finger to the body, and means holding the finger in the said first position from a position past the discharge position to a position in which the finger is beside the container, the conveyor means including a pair of spaced, parallel guides, each having a horizontal surface on which the container may rest, a dog movable along a line lying between the guides and adapted to engage and move a container, and an inclined block associated with each guide located a fixed distance from the path of movement of the transport means and adapted to lift the forward end of the container as the dog moves it along the guides, the container then sliding rearwardly down the block into a pre-selected pick-up position relative to the path of movement of the transport means.

6. A stacking apparatus for containers having hand holes, comprising a framework having an entrance end and an exit end, conveyor means associated with the entrance end of the framework for conveying containers one by one into the framework and depositing each container accurately in a pre-selected pick-up position, a transport means mounted on the framework, the transport means engaging the hand holes of each container, lifting it vertically, transporting it longitudinally, lowering it, and releasing it adjacent the exit end of the framework, means preventing swinging of the container during the passage from the entrance end to the exit end, means including a vertical push-out plate operable when a predetermined number of containers have been deposited in stacked relationship to move the containers in a body with harmonic motion longitudinally out of the framework at the exit end, a container-grasping member attached to the transport means, the container-grasping member consisting of a main body and a finger, the finger being hingedly attached to the body to be capable of assuming a first position close to the body or a second position at a right angle thereto, the body being mounted on transport means for movement therewith about a pivotal axis at a right angle to and spaced from the axis of hinged attachment of the finger to the body, and means holding the finger in the said first position, from a position past the discharge position to a position in which the finger is beside the container.

7. A stacking apparatus for containers having hand holes, comprising a framework having an entrance end and an exit end, conveyor means associated with the entrance end of the framework for conveying containers one by one into the framework and depositing each container accurately in a pre-selected pick-up position, a vertically-moving transport means mounted on the framework, the transport means engaging the hand holes of each container, lifting it vertically, transporting it longitudinally, lowering it, and releasing it adjacent the exit end of the framework, means preventing swinging of the container during the passage from the entrance end to the exit end, a vertical push-out plate operable when a predetermined number of containers have been deposited in stacked relationship to move the containers in a body with harmonic motion longitudinally out of the framework at the exit end, a container-grasping member attached to the transport means, the container-grasping member consisting of a main body and a finger, the finger being hingedly attached to the body to be capable of assuming a first position close to the body or a second position at a right angle thereto, the body being mounted on the transport means for movement therewith about a pivotal axis at a right angle to and spaced from the axis of hinged attachment of the finger to the body, and means holding the finger in the said first position from a position past the discharge position to a position in which the finger is beside the container, the said conveyor means associated with the entrance end of the framework including a pair of spaced, parallel guides each having a horizontal surface on which the container may rest, a dog movable along a line lying between the guides and adapted to engage and move a container, and an inclined block associated with each guide located a fixed distance from the paths of movement of the transport means and adapted to lift the forward end of the container as the dog moves it along the guides, the container then sliding rearwardly down the block into a pre-selected pick-up position relative to the path of movement of the transport means.

8. A stacking apparatus for containers having hand holes, comprising a framework having an entrance end and an exit end, conveyor means associated with the entrance end of the framework for conveying containers one by one into the framework and depositing each container accurately in a pre-selected pick-up position, a vertically-moving transport means mounted on the framework, the transport means engaging the hand holes of each container, lifting it vertically, transporting it longitudinally, lowering it, and releasing it adjacent the exit end of the framework, means preventing swinging of the container during the passage from the entrance end to the exit end, means including a vertical push-out means operable when a pre-determined number of containers have been deposited in stacked relationship to move the containers in a body longitudinally out of the framework at the exit end, the conveyor means associated with the entrance end of the framework including a horizontal surface on which the container may rest, a dog movable along the general plane of the horizontal surface and adapted to engage and move a container, and an inclined block associated with the conveyor means located a fixed distance from the path of movement of the transport means and adapted to lift the forward end of the container as the dog moves it along, the container then sliding rearwardly on the block to a pre-selected pick-up position relative to the path of movement of the transport means.

9. A stacking apparatus for containers having hand holes, comprising a framework having an entrance end and an exit end, conveyor means associated with the entrance end of the framework for conveying containers one by one into the framework and depositing each container accurately in a pre-selected pick-up position, a vertically-moving transport means mounted on the framework, the transport means engaging the hand holes of each container, lifting it vertically, transporting it longitudinally, lowering it, and releasing it adjacent the exit end of the framework, means preventing swinging of the container during the passage from the entrance end to the exit end, a container-grasping member attached to the transport means, the container-grasping member consisting of a main body and a finger, the finger being hingedly attached to the body to be capable of assuming a first position close to the body or a second position at a right angle thereto, the body being mounted on the transport means for movement therewith about a pivotal axis at a right angle to and spaced from the axis of the hinged attachment of the finger to the body, and means holding the finger in the said first position from a position past the discharge position to a position in which the finger is beside the container, the conveyor means including a dog movable along a generally horizontal line and adapted to engage and move a container, and an inclined block associated with the conveyor means located a fixed distance from the path of movement of the transport means and adapted to lift the forward end of the container as the dog moves it along, the container then sliding rearwardly down the block into a pre-selected pick-up position relative to the path of movement of the transport means.

10. A stacking apparatus for containers having hand holes, comprising a framework having an entrance end and an exit end, conveyor means associated with the entrance end of the framework for conveying containers one by one into the framework and depositing each container accurately in a pre-selected pick-up position, a transport means mounted on the framework, the transport means engaging the hand holes of each container lifting it vertically, transporting it longitudinally, lowering it, and releasing it adjacent the exit end of the framework, means preventing swinging of the container during the passage from the entrance end to the exit end, means including a push-out means operable when a pre-determined number of containers have been deposited in stacked relationship to move the containers in a body longitudinally out of the framework at the exit end, a container-grasping member attached to the transport means, the container-grasping member consisting of a main body and a finger, the finger being hingedly attached to the body to be capable of assuming a first position close to the body or a second position at a right angle thereto, the body being mounted on transport means for movement therewith about a pivotal axis at a right angle to and spaced from the axis of hinged attachment of the finger to the body, and means holding the finger in said first position from a position past the discharge position to a position in which the finger is beside the container.

References Cited in the file of this patent

UNITED STATES PATENTS

| | | |
|---|---|---|
| 2,028,410 | Rapisarda | Jan. 21, 1936 |
| 2,193,264 | Bashore | Mar. 12, 1940 |
| 2,266,170 | Currie | Dec. 16, 1941 |
| 2,311,577 | Rose | Feb. 16, 1943 |
| 2,491,298 | Carter | Dec. 13, 1949 |
| 2,528,114 | Cerruti | Oct. 31, 1950 |